(12) United States Patent
Leistner et al.

(10) Patent No.: US 6,817,079 B2
(45) Date of Patent: Nov. 16, 2004

(54) METHOD OF RIVETING A HEADED FASTENER

(75) Inventors: Walter H. Leistner, Goodwood (CA); Sung Hsiang Liu, Toronto (CA)

(73) Assignee: Falcon Fasteners Reg'D (CA)

( * ) Notice: Subject to any disclaimer, the term of this patent is extended or adjusted under 35 U.S.C. 154(b) by 205 days.

(21) Appl. No.: 10/299,655

(22) Filed: Nov. 20, 2002

(65) Prior Publication Data

US 2004/0093712 A1 May 20, 2004

(51) Int. Cl.⁷ ................................................ B23P 11/00
(52) U.S. Cl. .................. 29/432.1; 29/505; 29/512; 29/522.1; 29/525.05; 29/283.5; 29/243.5; 29/523; 411/177
(58) Field of Search ................................ 29/432.1, 505, 29/509, 512, 513, 521, 522.1, 524.1, 525.05, 525.11, 283.5, 798, 243.5, 523; 411/181, 177, 183, 188; 72/372

(56) References Cited

U.S. PATENT DOCUMENTS

| | | | | |
|---|---|---|---|---|
| 1,979,686 A | * | 11/1934 | Harry et al. | .................. 411/58 |
| 3,480,061 A | | 11/1969 | Leistner | |
| 4,508,478 A | | 4/1985 | Leistner | |
| 5,071,299 A | | 12/1991 | Sekine et al. | |
| 5,214,843 A | * | 6/1993 | Bromley et al. | .............. 29/798 |
| 5,288,244 A | | 2/1994 | Lien | |
| 5,327,645 A | * | 7/1994 | Bromley et al. | .............. 29/809 |
| 5,348,432 A | | 9/1994 | Nagayama | |
| 5,429,466 A | | 7/1995 | Nagayama | |
| 5,560,099 A | * | 10/1996 | Leistner et al. | ............... 29/798 |
| 5,863,164 A | | 1/1999 | Leistner | |
| 6,109,849 A | | 8/2000 | Nagayama | |

OTHER PUBLICATIONS

Blueprint dated May 21, 1969.
Blueprint dated Jul. 26, 2001.

* cited by examiner

Primary Examiner—David P. Bryant
Assistant Examiner—Jermie E. Cozart
(74) Attorney, Agent, or Firm—H. Jay Spiegel

(57) ABSTRACT

The method of the present invention is intended to be used in association with a headed fastener such as a tee nut, but not limited to a tee nut. The present method contemplates embodiments of a riveting pin having protuberances that cause the flared end of the shaft to be flared in one or more discontinuous portions of the circumference of the shaft, whereby "push out" and "spin-out" are deterred. Where the length of the fastener shaft is no longer than the thickness of the material through which it is inserted, a first design of flaring pin is provided. Where the length of the shaft of the fastener employed is greater than the thickness of the material through which it extends, a second embodiment of flaring pin is employed. In the former case, at least one discrete portion of the circumference of the shaft is flared into the wall of the passageway through which the shaft extends. In the latter case, at least one portion of the circumference of the shaft enters the wall of the passageway and at least one other portion folds over the exterior surface of the material.

25 Claims, 4 Drawing Sheets

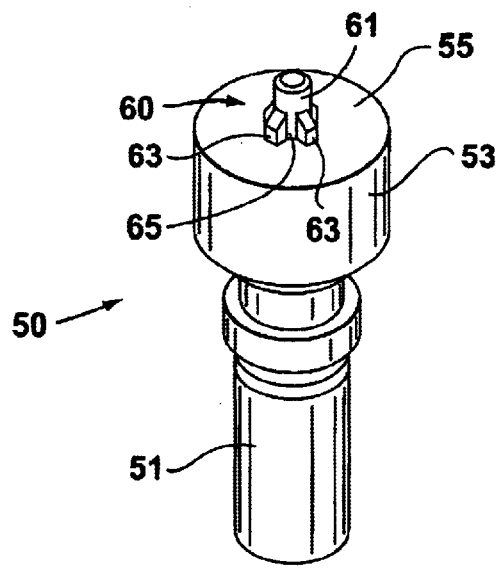
FIG. 5a
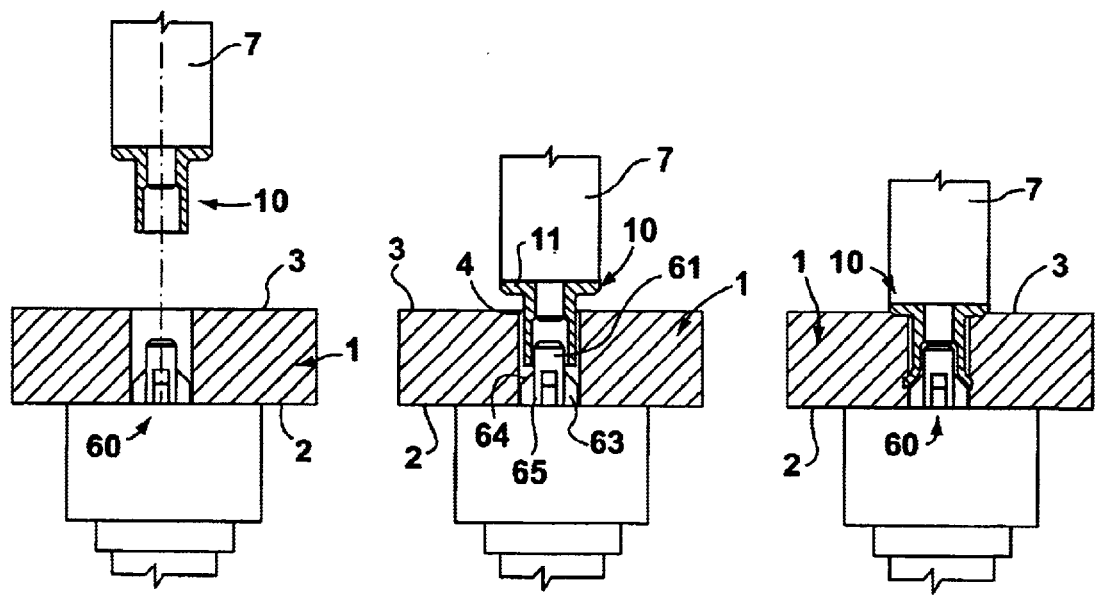
FIG. 5b　　　FIG. 5c　　　FIG. 5d

METHOD OF RIVETING A HEADED FASTENER

BACKGROUND OF THE INVENTION

The present invention relates to a method of riveting a headed fastener. In the prior art, it is known to provide a tee nut with a counterbore that makes it easier to rivet the tee nut either over a surface of a material or within a hole formed therethrough. Counterbored tee nuts have been known since as long ago as the late 1980s. A counterbored tee nut with a circular flange has been marketed since at least as early as 1988. In 1992, a counterbored tee nut having an octagonal flange was developed by Sigma Tool & Machine. U.S. Pat. No. 5,348,432 also discloses a counterbored tee nut having an octagonal flange. Recently, a patent application was filed disclosing and claiming a square-headed fastener having a shaft with a counterbore intended to be riveted. That application was assigned Ser. No. 10/105,248 and was filed on Mar. 26, 2002.

Typically, tee nuts are flared, whether fully threaded or counterbored, using an anvil and a flaring pin. The flaring pin enters the end of the shaft at an opening distal from the flange and flares the end radially outwardly with respect to an axis of elongation of the shaft. In some cases, when the shaft end is flared, discontinuities are formed about the circumference of the flared portion, although the locations of such discontinuities may not be accurately predicted.

Often, tee nuts that are flared have a flange with pawls or other ribs or projections extending in the same direction of elongation as that of the shaft so that they embed in the surface of the material through which the shaft extends to preclude the shaft from rotating when a threaded fastener is inserted therein. Often, these pawls, ribs or other projections are insufficient to preclude "spin-out" of the shaft when the fastener is inserted and rotated. The flared portion of the shaft is designed solely to preclude the tee nut from being pushed out of the material in which it has been installed. The present invention contemplates enhancing the function of the flared portion of a tee nut shaft so that it performs dual functions, (1) preventing push out, and (2) precluding "spin-out" of the shaft during fastener insertion.

SUMMARY OF THE INVENTION

The present invention relates to a method of riveting a headed fastener. The present invention includes the following interrelated objects, aspects and features:

(1) The present invention is intended to be used in association with a headed fastener such as a tee nut, but not limited to a tee nut. The present invention is equally usable on counterbored tee nuts as well as those that are fully threaded.

(2) In practicing the teachings of the inventive method, the present invention contemplates embodiments of a riveting pin having protuberances that cause the flared end of the shaft to be flared in one or more discontinuous portions of the circumference of the shaft. In the case of riveting, where the length of the shaft is greater than the thickness of the material through which it extends, the flared discontinuous portions or tangs are of two types, one type that digs into the top surface of the material and a second type that digs into the inner walls of the passage or hole through which the shaft extends. Each type deters "push out" and "spin-out." Where the shaft is of a length equal to or less than the thickness of the material through which it extends, the discontinuous portion or portions dig into the walls of the passage or hole through which the shaft extends to deter "push out" and "spin-out."

(3) In explaining the teachings of the present invention, the fastener which is disclosed as an example is a square-headed rivet fastener such as is disclosed in co-pending application Ser. No. 10/105,248. That fastener is counterbored and has a square flange with eight ribs extending upwardly from a top surface of the flange.

(4) Where the length of the fastener shaft is no longer than the thickness of the material through which it is inserted, a first design of flaring pin is provided. Where the length of the shaft of the fastener employed is greater than the thickness of the material through which it extends, a second embodiment of flaring pin is employed. In the former case, in order for the present invention to work, it is only necessary for one discrete portion of the circumference of the shaft to be flared into the wall of the passageway through which the shaft extends. In the latter case, for the invention to operate as intended, it is only necessary for one portion of the circumference of the shaft to enter the wall of the passageway and one other portion of the circumference of the shaft to be folded over and embedded into the exterior surface of the material.

(5) While the fastener example shown in this application is a square-headed rivet fastener, the teachings of the present invention are equally applicable to other kinds of fasteners having a shaft and a flange where the shaft is either fully threaded or counterbored.

As such, it is a first object of the present invention to provide a method of riveting a headed fastener.

It is a further object of the present invention to rivet a fastener comprising a tee nut.

It is a yet further object of the present invention to provide a method of riveting a fastener having any style flange so long as the shaft is elongated and hollow, whether or not counterbored.

It is a yet further object of the present invention to provide such a method applicable to a fastener having a flange and an elongated fully threaded shaft.

It is a still further object of the present invention to provide such a method in which a portion of the circumference of the shaft is bent and forced into a wall of a passageway through which the shaft extends.

It is a still further object of the present invention to provide such a method in which one portion of the shaft is bent and forced into the wall of the passageway through which the shaft extends and another portion of the circumference of the shaft is bent over an outer surface of the material.

These and other objects, aspects and features of the present invention will be better understood from the following detailed description of the preferred embodiments when read in conjunction with the appended drawing figures.

BRIEF DESCRIPTION OF THE DRAWINGS

FIG. 5a shows a perspective view of a flaring pin employed to flare the shaft of the square-headed rivet fastener as shown in FIGS. 2-4.

FIG. 5b shows a cross-sectional view of a first step in practicing the method in accordance with FIGS. 1-5.

FIG. 5c shows a cross-sectional view of a second step in practicing the method in accordance with FIGS. 1-5.

FIG. 5d shows a cross-sectional view of a third step in practicing the method in accordance with FIGS. 1-5.

SPECIFIC DESCRIPTION OF THE PREFERRED EMBODIMENTS

Figure 1:
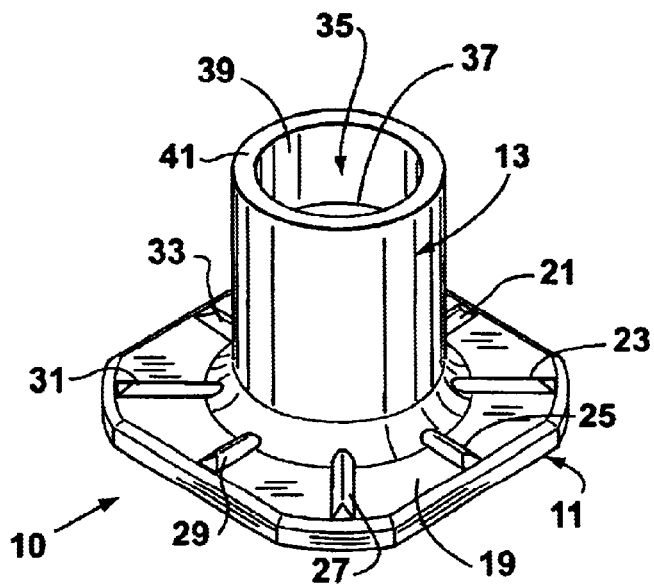
FIG. 1 shows a front perspective view of a square-headed rivet fastener, an example of a fastener on which the methods of the present invention may be applied.

With reference, first, to FIG. 1, a square-headed fastener is generally designated by the reference numeral 10 and is seen to include a flange 11 and a shaft 13 extending upwardly therefrom. The shaft 13 has an axis of elongation that is perpendicular to the generally planar extent of the flange 11.

The flange 11 has a top surface 19 which has, extending upwardly therefrom, a plurality of trapezoidal cross-section ribs of which those shown in FIG. 1 are identified by the reference numerals 21, 23, 25, 27, 29, 31 and 33. The eighth rib is hidden in the view of FIG. 1 by the structure of the shaft 13 but is shown in others of the figures.

The shaft 13 has an internal chamber 35 including a threaded portion 37 closest to the flange 11 and a counter-bored portion 39 nearest to the end of the shaft 13 distal from the flange 11, and which is unthreaded and has a thinner wall 41 than the thickness of the wall where the shaft is threaded at 37.

With reference, now, to FIGS. 2-5, practice of a first embodiment of method in accordance with the teachings of the present invention will now be explained. With reference, first, to FIG. 5, a riveting pin 50 is seen to include a shaft 51 allowing the riveting pin to be coupled to structure of a tee nut inserting machine (not shown). A large cylindrical protuberance 53 is provided at the end of the riveting pin 50 distal from the shaft 51. On an end surface 55 of the protuberance 53, riveting structure generally designated by the reference numeral 60 is shown. That structure includes a cylindrical distal shaft 61 sized to enter the passageway 35 through the shaft 13 of the fastener 10 and flaring structure including four ribs 63 spaced from one another about the circumference of the cylindrical portion 61 with spaces 65 provided between each pair of ribs 63. This structure is provided for purposes to be explained in greater detail hereinafter.

Figure 2:
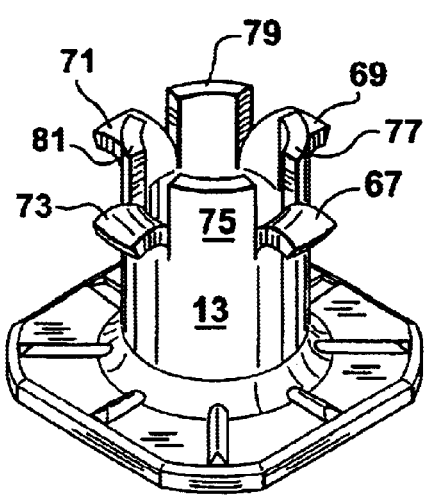
FIG. 2 shows a perspective view of the fastener of FIG. 1 after a first embodiment of flaring pin has been applied thereto.
Figure 3:
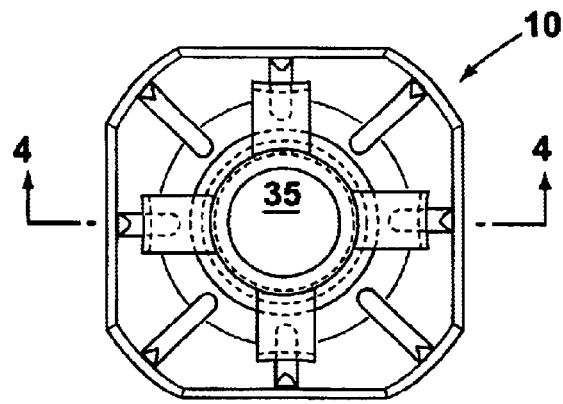
FIG. 3 shows a top view of the fastener of FIG. 2.
Figure 4:
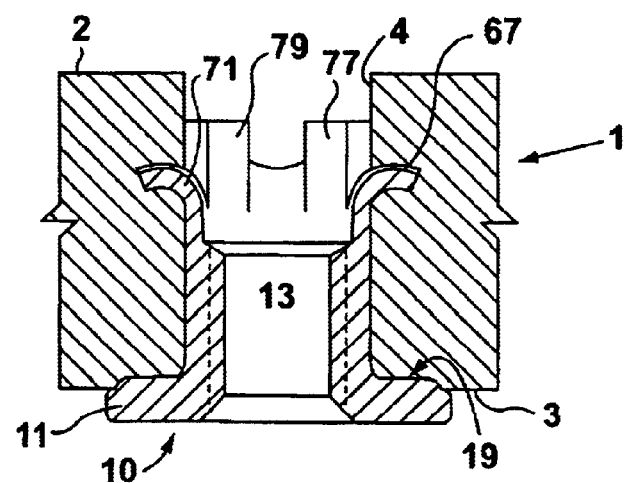
FIG. 4 shows a cross-sectional view along the line 4—4 of FIG. 3 showing a schematic representation of a material in which the fastener has been fastened.

With particular reference to FIGS. 2-4, it is seen that through operation of the riveting pin 50, the shaft 13 distal end has been flared at particular discrete locations about its circumference identified by the reference numerals 67, 69, 71 and 73. Other portions of the distal end of the shaft 13 designated by the reference numerals 75, 77, 79 and 81 are unaltered by operation of the riveting pin 50. The flaring of the portions 67, 69, 71 and 73 is caused by engagement of the ribs 63 of the riveting pin while the cylindrical shaft 61 is inserted within the passageway 35 (FIG. 3) of the fastener 10.

The portions 75, 77, 79 and 81 of the shaft 13 that are unaltered by operation of the riveting pin 50 are those portions that are located at 65 between adjacent pairs of ribs 63 of the riveting pin 50.

As shown in FIG. 4, the material 1 has a top surface 2 and a bottom surface 3 that engages the top surface 19 of the flange 11 of the fastener 10. The portions or tangs 67 and 71 of the shaft 13 are seen digging into the interior of the piece of material 1 through the wall 4 defining the passageway or hole through the material 1. As also seen, the portions 77 and 79 of the shaft 13 are unaltered.

Reference is now made to FIGS. 5a, 5b, 5c and 5d so that an explanation of the method of flaring the fastener to the configuration illustrated in FIGS. 2-4 can be explained. With reference to FIG. 5c, it is seen that the riveting structure 60 including the cylindrical distal shaft 61, ribs 63, and spaces 65 are within the hole 4 formed in the substrate 1. The fastener 10 has been inserted into the hole 4 from the other end thereof and the end 41 of the shaft 13 thereof is resting on the angled top surfaces 64 of the ribs 63. The flange 11 of the fastener 10 is spaced above the top surface 2 of the substrate 1.

A reciprocating fitting 7 of the insertion machine carries and reciprocates the fastener 10 in the downward direction in the view of FIGS. 5b-d so that, with reference to FIG. 5d, discrete circumferentially spaced portions of the shaft 13, such as those designated by the reference numerals 67 and 71 (see, also, FIG. 3) are cut away from the shaft 13 and are embedded in the walls of the hole 4 of the substrate 1. This action is completed when the flange 11 abuts the surface 3 of the substrate 1 as seen in FIG. 5d.

Figure 10A:
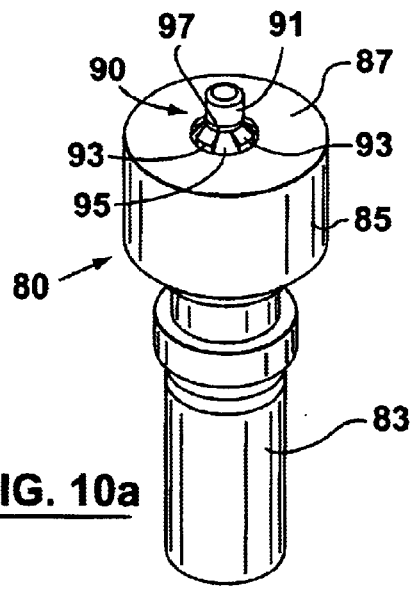
FIG. 10a shows a perspective view of a second embodiment of flaring pin used to flare the shaft of the tee nut as shown in FIGS. 6-9.
Figure 10B:
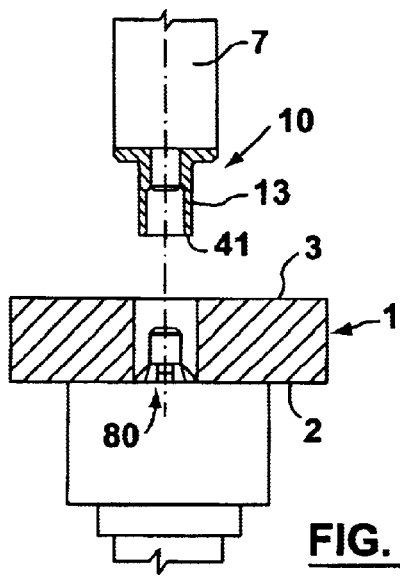
FIG. 10b shows a cross-sectional view of a first step in practicing the method as illustrated in FIGS. 6-10.

Reference is now made to FIG. 10a which shows a second embodiment of riveting pin generally designated by the reference numeral 80 and including a shaft 83 designed to be coupled to the structure of the insertion machine on which it is fastened, and a cylindrical protuberance 85 having a surface 87 on which flaring structure 90 is provided. The flaring structure 90 includes a cylindrical shaft 91 sized and configured to enter the passageway 35 of the fastener 10, and a plurality of ribs 93 spaced from one another by tapered regions 95 as seen in FIG. 10a.

Figure 8:
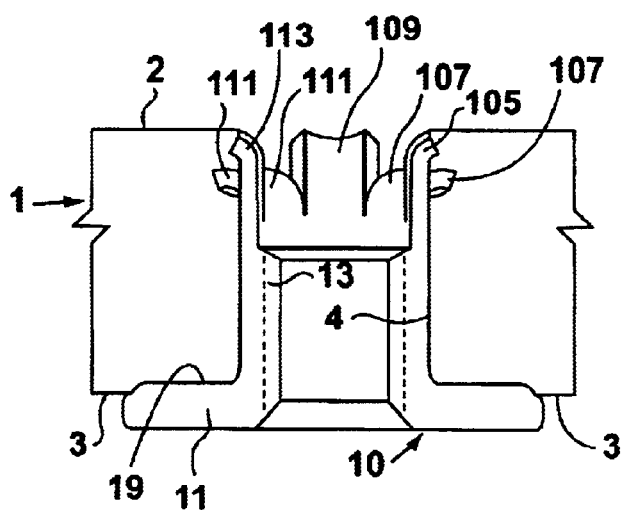
FIG. 8 shows a cross-sectional view along the line 8—8 of FIG. 7 including a schematic representation of a material to which the fastener has been fastened.

With reference, now, to FIGS. 6-9, an explanation of the second embodiment of the method in accordance with the teachings of the present invention will now be made. With reference, first, to FIG. 8, the piece of material 1 has its top surface 2, its bottom surface 3 engaged by the top surface 19 of the flange 11 of the fastener 10 and includes the passageway 4 through which the shaft 13 of the fastener 10 extends. In the embodiment illustrated in FIGS. 6-9, the shaft length is greater than the thickness of the material 1 from the surface 2 to the surface 3.

Figure 6:
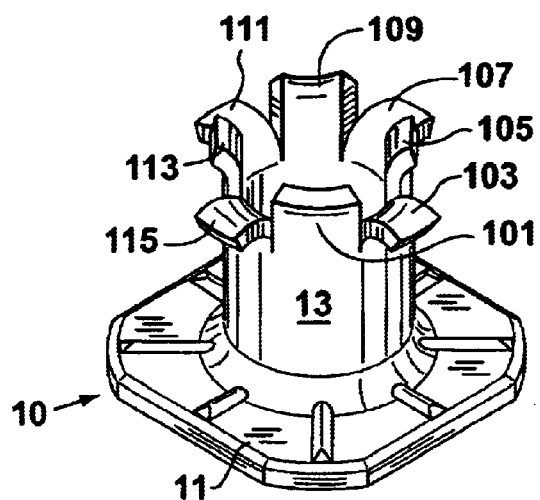
FIG. 6 shows a perspective view of the fastener of FIG. 1 after a second embodiment of flaring pin has been applied thereto.
Figure 7:
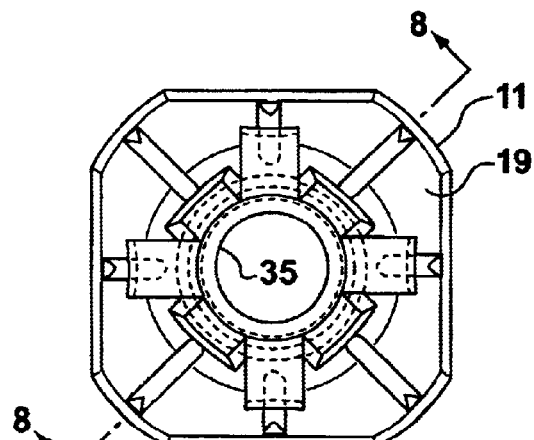
FIG. 7 shows a top view of the fastener of FIG. 6.

The fastener 10 as seen in FIG. 6 has been flared through operation of the riveting pin 80 as seen in FIGS. 10a-e. As seen in FIG. 6, the distal end of the shaft 13 with respect to the flange 11 includes eight discrete circumferentially adjacent portions designated by the reference numerals 101, 103, 105, 107, 109, 111, 113 and 115. With reference, again, to FIG. 8, it is seen that the portions 105, 109 and 113 are slightly flared over the surface 2 of the material 1 and embedded therein, while the portions 107 and 111 are flared more extremely so that they embed into the material 1 within the hole as shown.

Figure 10C:
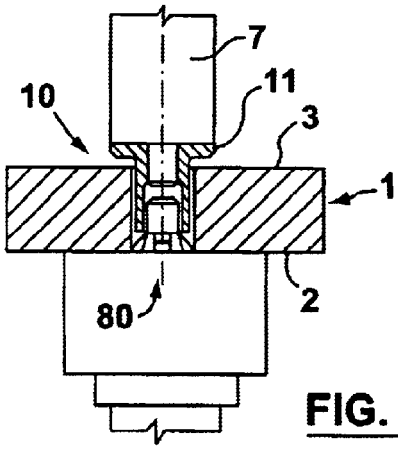
FIG. 10c shows a cross-sectional view of a second step in practicing the method as illustrated in FIGS. 6-10.

This configuration is achieved in the following manner: With reference to FIG. 10c, the riveting pin 80, flaring structure 90 is completely inserted within the hole 4 formed through the substrate 1 including the cylindrical shaft 91, the ribs 93, and the tapered regions 95. The fastener 10 is seen inserted into the hole 4 from the other end thereof with the end 41 of the shaft 13 engaging the angled surfaces 94 of the ribs 93.

Figure 10D:
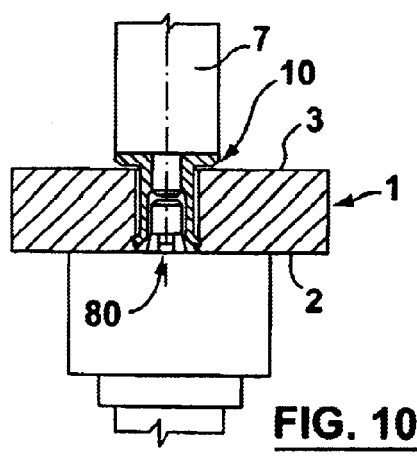
FIG. 10d shows a cross-sectional view of a third step in practicing the method as illustrated in FIGS. 6-10.

With reference to FIG. 10d, structure of the insertion machine (not shown) moves the fastener 10 in the downward direction in the view of FIG. 10d such that the portions 103, 107, 111 and 115 are cut away from the shaft 13 and embedded within the walls of the hole 4 (see, as well, FIG. 8).

Figure 10E:
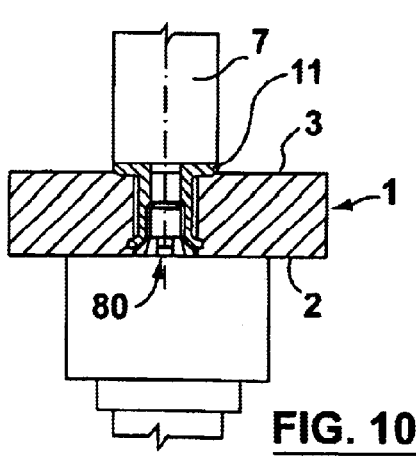
FIG. 10e shows a cross-sectional view of a fourth step in practicing the method as illustrated in FIGS. 6-10, rotated 45° from the views of FIGS. 10b, c, and d.

With further reference to FIG. 10e, further downward movement of the fastener 10 causes the remaining portions of the shaft 13 designated by the reference numerals 101, 105, 109 and 113 (FIG. 6) to be flared over the surface 2 of the substrate 1, this action terminating when the flange 11 of the fastener 10 engages the wall 3 of the substrate 1.

If desired, the flaring pin can be designed to cut different adjacent tangs from the shaft and deflect them into the walls of the hole 4 of the substrate 1 at differing heights. Thus, for example, with reference to FIG. 6, the tangs 103, 107, 111 and 115 are shown deflected at equal height to one another. The reason this occurs is self-evident when one views FIG. 10a and realizes that the surfaces 94 of the ribs 93 are at equal height. By making surfaces 94 of adjacent ribs 93 of differing heights, it is possible to stagger the elevations of embedding of the tangs formed from the shaft 13 along the length of the hole 4 of the substrate 1.

When the riveting pin 80 cylindrical shaft 91 enters the passageway 35 within the fastener 10, first, the portion or shoulder 97 engages the entire circumference of the passageway 35 of the shaft 13 of the fastener 10 and flares the entirety thereof to the configuration shown by the portions 105, 109 and 113. Further reciprocation cuts and separates out the eight portions 101–115 and engagement of the ribs 93 on the portions 103, 107, 111 and 115 causes them to further flare to the configuration shown in FIG. 8 embedded within the material 1 in the hole below the surface 2 thereof.

In this way, the portions 101, 105, 109 and 113 as well as the portions 103, 107; 111 and 115 act to preclude both "push out" and "spin-out."

As explained above, the present invention is practiced using fastener insertion machines which are designed to feed a series of fasteners using a feeding mechanism to a location where a reciprocating member inserts each fastener through an opening in a piece of material or workpiece such as, for example, a piece of wood. As the fastener is being inserted through the material, with the flaring pin already inserted into the opening from the other end, the shaft end remote from the flange impacts upon a flaring pin such as is illustrated in FIGS. 5a and 10a, which is mounted on an anvil on the insertion machine. Examples of insertion machines usable in practicing the methods of the present invention include those disclosed and claimed in U.S. Pat. No. 5,214,843 to Bromley et al., U.S. Pat. No. 5,323,531 to Leistner et al., U.S. Pat. No. 5,327,645 to Bromley et al., U.S. Pat. No. 5,560,099 to Leistner et al., and U.S. Pat. No. 5,606,794 to Leistner.

Each of the methods of the present invention begin with attachment of the riveting pin to the anvil of a fastener insertion machine. Once the riveting pin has been so attached, fasteners are fed to a location where they may be reciprocated through an opening in a workpiece through which the riveting pin has already been inserted from the other side. When the fastener reciprocates through an opening formed in a workpiece such as a piece of wood, the end of the shaft thereof remote from the flange engages the riveting pin. In the case of the embodiment of FIGS. 1-5, the end of the passageway 35 of the fastener 10 reciprocates over the cylindrical protrusion 61 and when the shaft 13 hits the ribs 63, the configuration shown in FIGS. 2-4 is achieved with the portions 67, 69, 71 and 73 of the shaft 13 being splayed outwardly through interaction with the ribs 63 so that they embed in the walls of the hole through the piece of material or workpiece 1 as specifically shown in FIG. 4, while the portions 75, 77, 79 and 81 of the shaft 13 are undisturbed since they are located in the regions 65 between adjacent pairs of ribs 63.

Figure 9:
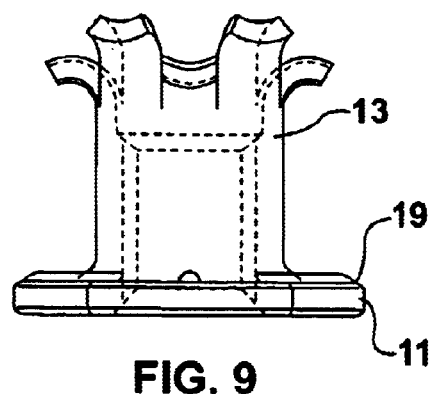
FIG. 9 shows a side view rotated 45° from the cross-sectional view of FIG. 8.

In the case of the embodiment of FIGS. 6-10, when the fastener 10 is reciprocated by the insertion machine, with the flaring pin 90 already inserted in the opening of the substrate from the other side, the end of the shaft 13 distal from the flange 11 reciprocates over the cylindrical protrusion 91 of the riveting pin 80. When the end 41 of the shaft 13 engages the surfaces 94 of the ribs 93, further reciprocation of the fastener 10 causes the portions 103, 107; 111 and 115 to be cut away from the shaft 13 and to embed within the walls of the hole 4 of the substrate 1. Further reciprocation of the fastener 10 over the flaring pin 90 causes the portions 101, 105, 109 and 113 to engage the tapered surfaces 95 causing those portions to assume the configuration shown as best seen in FIGS. 6, 8 and 9, with the portions 101, 105, 109 and 113 flared over the surface 2 of the substrate 1.

Concerning each method embodiment, once the fastener has been inserted and the distal end of the shaft 13 thereof has been altered in the manner best seen in FIGS. 4 and 8, the portion of the insertion machine that reciprocates the fastener retracts so that the next fastener can be placed thereon for the next insertion.

Each embodiment of the inventive method has been found to insert and rivet fasteners such as the square-headed fastener shown in FIG. 1 in an effective manner that precludes both "push out" and "spin-off."

As such, an invention has been disclosed in terms of preferred embodiments thereof, which fulfill each and every one of the objects of the invention as set forth hereinabove, and provide a new and useful method of riveting a headed fastener of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A method of flaring a fastener, including the steps of:
   a) providing a fastener having a flange and an elongated hollow shaft extending from a surface of said flange, said shaft having a passageway extending therethrough and opening at an end of said shaft;

b) providing a flaring pin having a protrusion sized to be received in said passageway and, below said protrusion, at least one rib extending about a fraction of a circumference of said protrusion, and an open area adjacent said rib;

c) inserting said flaring pin into a hole through a workpiece;

d) reciprocating said shaft so that said end of said shaft overlies said protrusion;

e) further reciprocating said shaft so that said shaft end engages said rib and said rib flares a portion of said shaft engaged by said rib radially outwardly to form a tang partially embedded in said workpiece, other portions of said shaft remote from said rib remaining unflared;

f) said tang precluding said fastener from being pushed out of said hole or spinning with respect to said workpiece.

2. The method of claim 1, wherein said passageway is fully threaded.

3. The method of claim 1, wherein said passageway is threaded adjacent said flange and unthreaded remote from said flange.

4. The method of claim 1, wherein said passageway is cylindrical.

5. The method of claim 1, wherein said at least one rib comprises a plurality of ribs circumferentially spaced about said circumference, adjacent ribs being separated by said open area.

6. The method of claim 5, wherein, during said further reciprocating step, said ribs flare circumferentially spaced portions of said shaft.

7. The method of claim 5, wherein said plurality of ribs comprises four ribs.

8. The method of claim 1, wherein said step of providing a flaring pin includes the step of providing said flaring pin with a tapered surface below said at least one rib.

9. The method of claim 8, just after said further reciprocating step, said method includes the step of additionally reciprocating said shaft so that said tapered surface engages a further portion of said shaft unflared by said rib and flares said further portion radially outwardly.

10. The method of claim 9, wherein said at least one rib comprises a plurality of ribs circumferentially spaced about said circumference, adjacent ribs being separated by respective tapered surfaces.

11. The method of claim 10, wherein said plurality of ribs comprises four ribs.

12. The method of claim 10, wherein a length of said shaft is greater than a thickness of said workpiece.

13. The method of claim 12, wherein, during said additionally reciprocating step, portions of said shaft are embedded in an outer surface of said workpiece.

14. The method of claim 13, wherein, during said further reciprocating step, other portions of said shaft are embedded within said hole.

15. The method of claim 1, said tang being embedded within said hole.

16. The method of claim 1, said tang being embedded into an outer surface of said workpiece.

17. A method of flaring a fastener, including the steps of:

a) providing a fastener having a flange and an elongated hollow shaft extending from a surface of said flange, said shaft having a passageway extending therethrough and opening at an end of said shaft;

b) providing a flaring pin having a protrusion sized to be received in said passageway and, below said protrusion, a plurality of ribs circumferentially spaced about said circumference, adjacent ribs being separated by respective open areas;

c) inserting said flaring pin into one end of a hole through a workpiece;

d) reciprocating said shaft into said hole from another end of said hole so that said shaft end overlies said protrusion;

e) further reciprocating said shaft so that said shaft end engages said ribs and flares spaced portions of said shaft engaged by said ribs radially outwardly to form spaced tangs partially embedded in said workpiece;

f) said tangs precluding said fastener from being pushed out of said hole or spinning with respect to said workpiece.

18. The method of claim 17, wherein said passageway is threaded adjacent said flange and unthreaded remote from said flange.

19. The method of claim 17, wherein said step of providing a flaring pin includes the step of providing said flaring pin with tapered surfaces between said ribs.

20. The method of claim 19, wherein, just after said further reciprocation step, said method includes the step of additionally reciprocating said shaft so that said tapered surfaces engage said shaft end and flare other portions of said shaft radially outwardly.

21. The method of claim 20, wherein, during said additionally reciprocating step, said other portions of said shaft are embedded in an outer surface of said workpiece.

22. The method of claim 21, wherein, during said further reciprocating step, said portions of said shaft are embedded within said hole.

23. The method of claim 17, said tangs being embedded within said hole.

24. The method of claim 17, said tangs being embedded into an outer surface of said workpiece.

25. The method of claim 17, wherein a length of said shaft is greater than a thickness of said workpiece.

* * * * *